United States Patent
Yu

(10) Patent No.: US 8,890,848 B2
(45) Date of Patent: Nov. 18, 2014

(54) OPTICAL TOUCH DEVICE

(71) Applicant: UC-Logic Technology Corp., New Taipei (TW)

(72) Inventor: Joe Yu, New Taipei (TW)

(73) Assignee: UC-Logic Technology Corp., New Taipei (TW)

( * ) Notice: Subject to any disclaimer, the term of this patent is extended or adjusted under 35 U.S.C. 154(b) by 33 days.

(21) Appl. No.: 13/797,748

(22) Filed: Mar. 12, 2013

(65) Prior Publication Data

US 2013/0187892 A1    Jul. 25, 2013

Related U.S. Application Data

(63) Continuation-in-part of application No. 13/506,138, filed on Mar. 29, 2012.

(30) Foreign Application Priority Data

| Jun. 2, 2011 | (TW) | 100119423 A |
| Jul. 1, 2011 | (TW) | 100123310 A |
| Mar. 13, 2012 | (TW) | 101108475 A |
| Mar. 13, 2012 | (TW) | 101204490 A |

(51) Int. Cl.
*G06F 3/042* (2006.01)

(52) U.S. Cl.
CPC .... *G06F 3/0423* (2013.01); *G06F 2203/04104* (2013.01)
USPC .......................................................... 345/175

(58) Field of Classification Search
USPC .................................................. 345/156–184
See application file for complete search history.

(56) References Cited

U.S. PATENT DOCUMENTS

| 7,113,174 | B1 * | 9/2006 | Takekawa et al. ............ 345/173 |
| 2001/0002694 | A1 * | 6/2001 | Nakazawa et al. ............ 250/221 |
| 2001/0028344 | A1 * | 10/2001 | Iwamoto et al. ............. 345/175 |
| 2003/0206306 | A1 * | 11/2003 | Omura et al. ................ 356/620 |
| 2005/0264541 | A1 * | 12/2005 | Satoh ............................ 345/173 |
| 2008/0143690 | A1 * | 6/2008 | Jang et al. .................... 345/175 |
| 2009/0244018 | A1 * | 10/2009 | Lin et al. ...................... 345/173 |
| 2010/0328243 | A1 * | 12/2010 | Wang et al. ................... 345/173 |
| 2011/0163996 | A1 * | 7/2011 | Wassvik et al. .............. 345/175 |

* cited by examiner

*Primary Examiner* — Chanh Nguyen
*Assistant Examiner* — Sanghyuk Park
(74) *Attorney, Agent, or Firm* — Kilpatrick Townsend & Stockton LLP

(57) ABSTRACT

An optical touch device includes: two light beam scanning modules each scanning a touch region of a panel body with a scanning light beam, whose incident angle varies with time, and outputting a time index signal associated with the incident angle; two light sensor modules each sensing a corresponding reflected scanning light beam generated due to presence of a touch within the touch region so as to output a sensing signal; and a processing unit for locating the touch based on the time index signal from each light beam scanning module, the sensing signal from each light sensor module, and a look-up table having pieces of angle information corresponding to a series of time indexes and associated with the incident angle of each scanning light beam.

6 Claims, 7 Drawing Sheets

OPTICAL TOUCH DEVICE

CROSS-REFERENCE TO RELATED APPLICATION

This application claims priority to Taiwanese Application Nos. 101108475 and 101204490, both filed on Mar. 13, 2012, and is a continuation in-part (CIP) of co-pending U.S. patent application Ser. No. 13/506,138, entitled "OPTICAL TOUCH DEVICE AND LOCATING METHOD THEREOF", filed on Mar. 29, 2012 which claims priority to Taiwanese Application No. 100119423 filed Jun. 2, 2011 and Taiwanese Application No. 100123310 filed Jul. 1, 2011, the disclosures of which are incorporated by reference herein.

BACKGROUND OF THE INVENTION

1. Field of the Invention

The invention relates to a touch device, and more particularly to an optical touch device.

2. Description of the Related Art

Referring to FIG. 1, a conventional optical detection system disclosed in Taiwanese Patent Application Publication No. 201035836 is shown to include a scanning device 110, a linear sensor 120, and a distinguishing unit 130. The scanning device 110 includes a light source 112, a mirror 114, and a rotating actuator 116. The light source 112 is operable to generate a scan light beam. The mirror 115 is positioned to direct the scan light beam into a detection region 140. The rotating actuator 116 is coupled to the mirror 114 for rotating the mirror 114 and thereby varying an incident angle of the scan light beam with time. The linear sensor 120 is positioned to sense two reflected scan light beams 610, 620 respectively generated due to reflection of the scan light beam by two actual touches (T1, T2) within the detection region 140. The distinguishing unit 130 is operable to distinguish the actual touches (T1, T2) from two ghost touches (G1, G2) according to time signals which respectively indicate the times that the reflected scan light beam 610, 620 are sensed by the sensor 120.

However, for such a configuration, the locations of the actual touches (T1, T2) are determined according to the incident angles of the reflected scan light beams 610, 620 by way of triangulation, in which involves relatively complicated computation.

SUMMARY OF THE INVENTION

Therefore, an object of the present invention is to provide an optical touch device that can overcome the aforesaid drawbacks of the prior art.

According to the present invention, an optical touch device comprises a panel body, a first light beam scanning module, a second light beam scanning module, a first light sensor module, a second light sensor module, a memory, and a processing unit.

The panel body has a surface configured with a touch region, and a peripheral region that surrounds the touch region.

The first light beam scanning module is mounted to the peripheral region for continuously scanning the touch region with a first scanning light beam in a manner that a first incident angle of the first scanning light beam relative to a reference line varies within a predetermined angle range with time. The first light beam scanning module is operable to output a first time index signal that is associated with the first incident angle of the first scanning light beam, that varies with time during each scanning cycle, and that represents one of a series of time indexes. The first light beam scanning module includes a first light source, a first mirror and a first rotating actuator. The first light source continuously generates a first light beam. The first mirror is positioned to reflect the first light beam to generate the first scanning light beam incident into the touch region. The first mirror has a first center passed through by the reference line. The first rotating actuator is coupled to the first mirror for continuously rotating back and forth the first mirror about the first center to thereby vary the first incident angle of the first scanning light beam within the predetermined angle range during each scanning cycle. The first rotating actuator is operable to generate and output the first time index signal during rotation of the first mirror.

The second light beam scanning module is mounted to the peripheral region for continuously scanning the touch region with a second scanning light beam in a manner that, during each scanning cycle, which is the same as that of the first light beam scanning module, a second incident angle of the second scanning light beam relative to the reference line varies within the predetermined angle range with time. The second light beam scanning module is operable to output a second time index signal that is associated with the second incident angle of the second scanning light beam, that varies with time during each scanning cycle, and that represents one of the series of time indexes. The second light beam scanning module includes a second light source, a second mirror and a second rotating actuator. The second light source continuously generates a second light beam. The second mirror is positioned to reflect the second light beam to generate the second scanning light beam incident into the touch region. The second mirror has a second center passed through by the reference line. The second rotating actuator is coupled to the second mirror for continuously rotating back and forth the second mirror about the second center to thereby vary the second incident angle of the second scanning light beam within the predetermined angle range during each scanning cycle. The second rotating actuator is operable to generate and output the second time index signal during rotation of the second mirror.

The first light sensor module is mounted to the peripheral region for sensing at least one reflected first scanning light beam generated due to reflection of the first scanning light beam by at least one touch within the touch region so as to output a first sensing signal.

The second light sensor module is mounted to the peripheral region for sensing at least one reflected second scanning light beam generated due to reflection of the second scanning light beam by said at least one touch within the touch region so as to output a second sensing signal.

The memory stores a look-up table. The look-up table includes the series of time indexes and a plurality of pieces of angle information. The time indexes correspond respectively to a series of time points within each scanning cycle of the first and second light beam scanning modules, during which each of the first and second mirrors is actuated by the respective one of the first and second rotating actuators to rotate back and forth once. Each of the time indexes is associated with the first and second incident angles of the first and second scanning light beams at a corresponding one of the time points within each scanning cycle of the first and second light beam scanning modules. Each piece of angle information corresponds to a respective one of the time indexes, and is associated with a respective one of the first and second incident angles of the first and second scanning light beams at the corresponding one of the time points that corresponds to the respective one of the time indexes.

The processing unit is connected electrically to the first and second light beam scanning modules, the first and second light sensor modules and the memory. The processing unit receives the first and second time index signals respectively from the first and second light beam scanning modules, and the first and second sensing signals respectively from the first and second light sensor modules. The processing unit is operable to locate said at least one touch based on a first candidate one of the time indexes, which is represented by the first time index signal that is received by the processing unit upon receipt of the first sensing signal by the processing unit, a second candidate one of the time indexes, which is represented by the second time index signal that is received by the processing unit upon receipt of the second sensing signal by the processing unit, and the look-up table stored in the memory.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
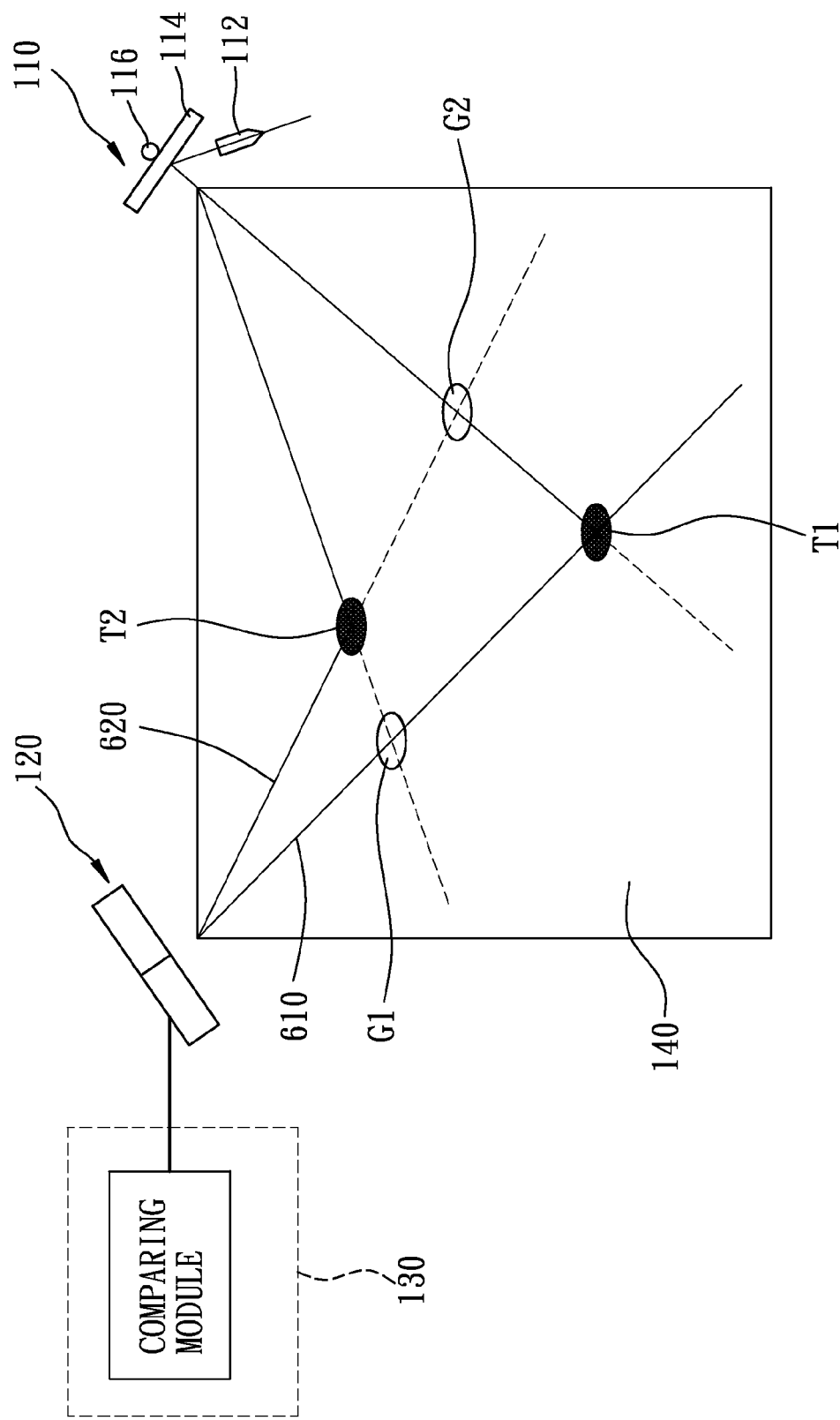
FIG. 1 is a schematic view of a conventional optical detection system.
Figure 2:
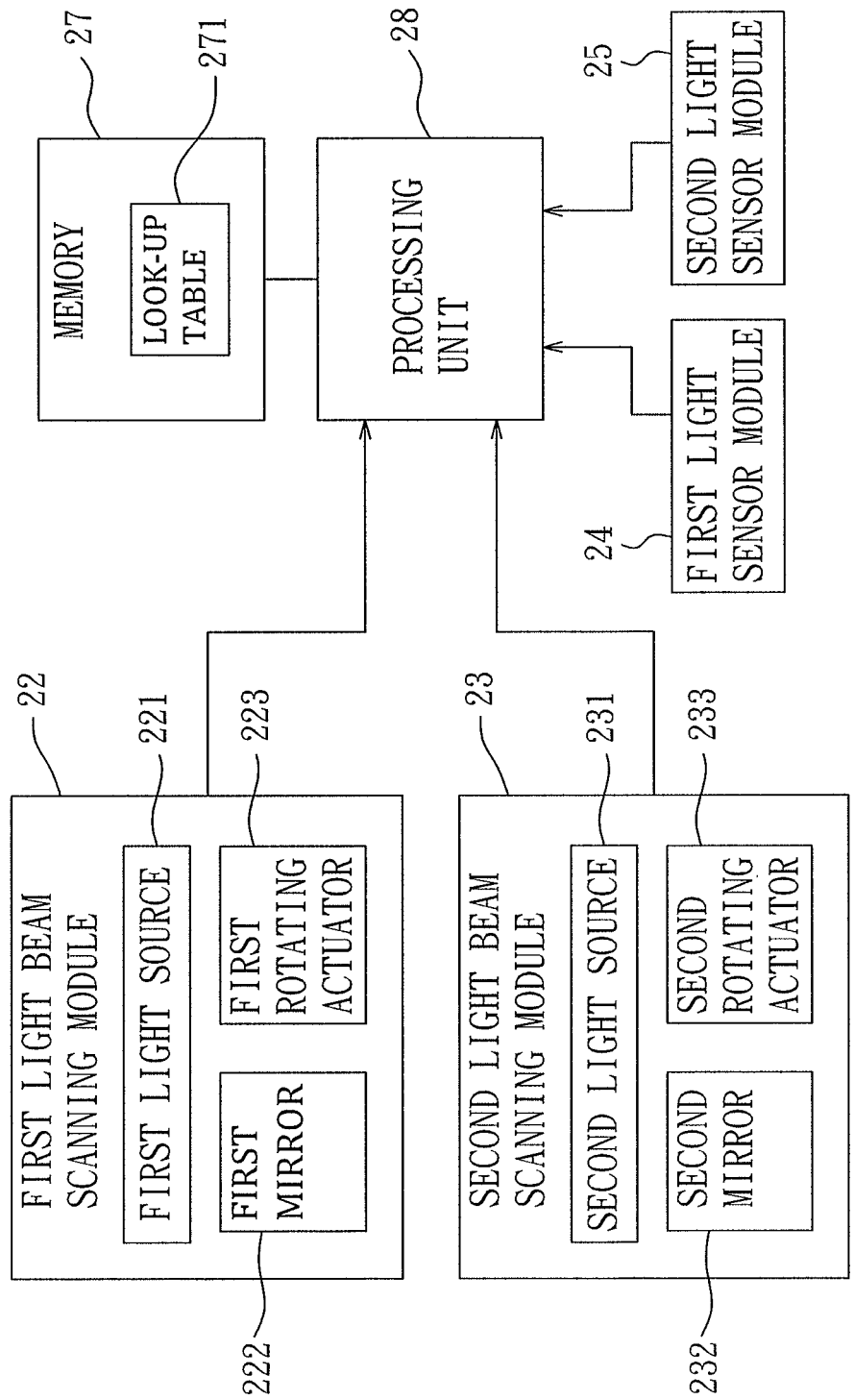
FIG. 2 is a schematic block diagram illustrating a preferred embodiment of an optical touch device according to the present invention.
Figure 3:
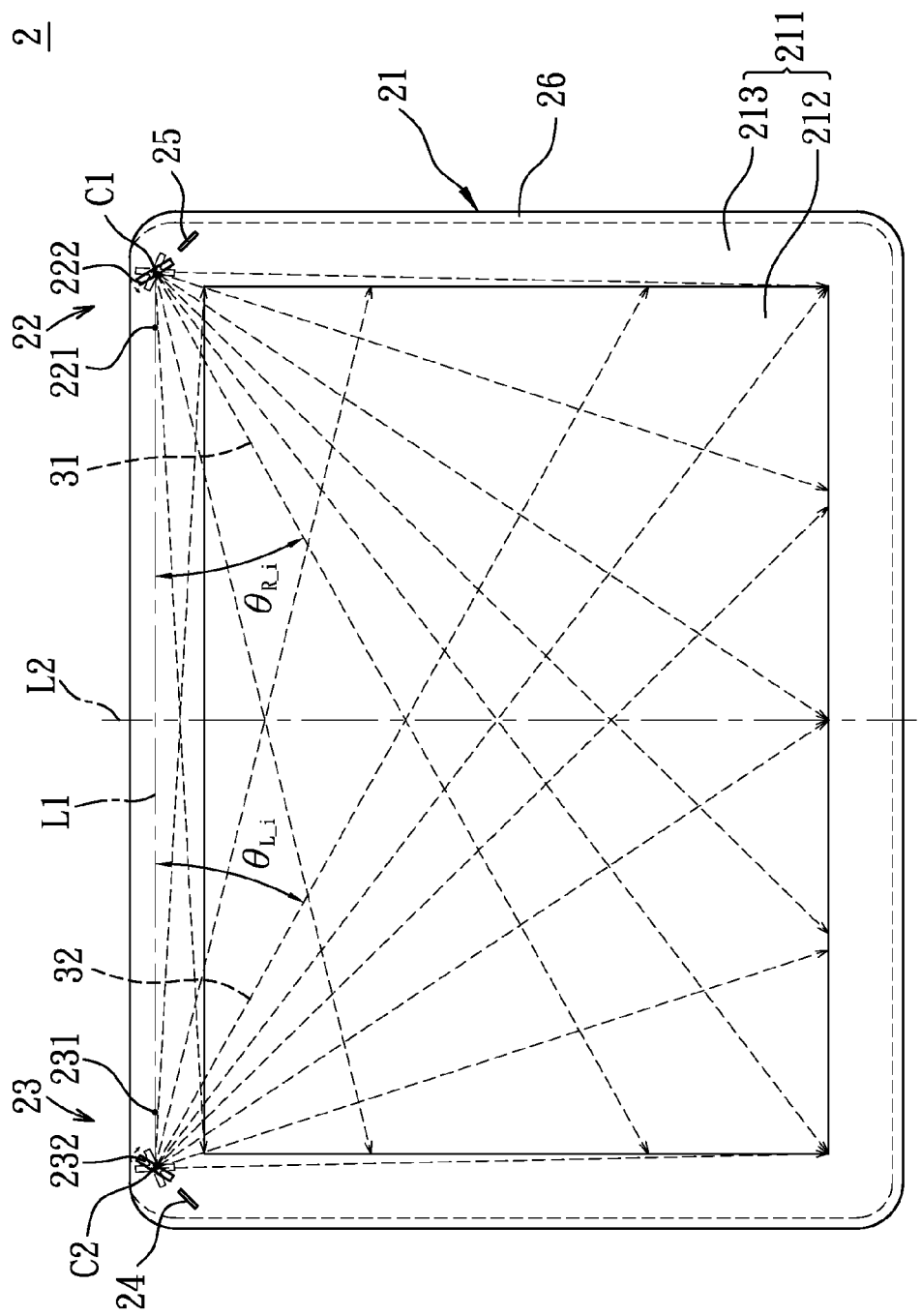
FIG. 3 is a schematic side view illustrating relationships among first and second light beam scanning modules and a panel body of the preferred embodiment of the optical touch.

Referring to FIGS. 2 and 3, the preferred embodiment of an optical touch device 2 according to the present invention is shown to include a panel body 21, a first light beam scanning module 22, a second light beam scanning module 23, a first light sensor module 24, a second light sensor module 25, a light absorption member 26, a memory 27, and a processing unit 28.

The panel body 21 has a surface 211 configured with a touch region 212, and a peripheral region 213 surrounding the touch region 212. In this embodiment, the touch region 212 is rectangular, and the peripheral region 213 consists of upper, lower, left and right sub-regions.

In this embodiment, the first light beam scanning module 22 is mounted to the upper sub-region of the peripheral region 213, and is disposed adjacent to an upper right corner of the touch region 212. The first light beam scanning module 22 is operable to continuously scan the touch region 212 with a first scanning light beam 31 in a manner that, during each scanning cycle, a first incident angle ($\theta_{R\_i}$) of the first scanning light beam 31 relative to a reference line (L1) varies within a predetermined angle range with time. The first light beam scanning module 22 is further operable to output a first time index signal ($t_{R\_i}$) that is associated with the first incident angle ($\theta_{R\_i}$) of the first scanning light beam 31, that varies with time during each scanning cycle, and that represents one of a series of time indexes ($t_1 \sim t_n$). The first light beam scanning module 22 includes a first light source 221, a first mirror 222 and a first rotating actuator 223. The first light source 221, e.g., a laser diode or an LED, continuously generates a first light beam. The first mirror 222 is positioned to reflect the first light beam to generate the first scanning light beam 31 incident into the touch region 212. The first mirror 222 has a first center (C1) passed through by the reference line (L1). The first rotating actuator 223 is coupled to the first mirror 222 for continuously rotating back and forth the first mirror 222 about the first center (C1) to thereby vary the first incident angle ($\theta_{R\_i}$) of the first scanning light beam 31 within the predetermined angle range during each scanning cycle. The first rotating actuator 223 is operable to generate and output the first time index signal ($t_{R\_i}$) during rotation of the first mirror 222.

In this embodiment, the second light beam scanning module 23 is mounted to the upper sub-region of the peripheral region 213, and is disposed adjacent to an upper left corner of the touch region 212. The second light beam scanning module 23 is operable to continuously scan the touch region 212 with a second scanning light beam 32 in a manner that, during each scanning cycle, which is the same as that of the first light beam scanning module 22, a second incident angle ($\theta_{L\_i}$) of the second scanning light beam 32 relative to the reference line (L1) varies within a predetermined angle range with time. The second light beam scanning module 23 is further operable to output a second time index signal ($t_L$) that is associated with the second incident angle ($\theta_{L\_i}$) of the second scanning light beam 32, that varies with time during each scanning cycle, and that represents one of the series of time indexes ($t_1 \sim t_n$). The second light beam scanning module 23 includes a second light source 231, a second mirror 232, and a second rotating actuator 233. The second light source 231, e.g., a laser diode or an LED, continuously generates a second light beam. The second mirror 232 is positioned to reflect the second light beam to generate the second scanning light beam 32 incident into the touch region 212. The second mirror 232 has a second center (C2) passed through by the reference line (L1). The second rotating actuator 233 is coupled to the second mirror 232 for continuously rotating back and forth the second mirror 232 about the second center (C2) to thereby vary the second incident angle ($\theta_{L\_i}$) of the second scanning light beam 32 within the predetermined angle range during each scanning cycle. The second rotating actuator 233 is operable to generate and output the second time index signal ($t_{L\_i}$) during rotation of the second mirror 232.

It is noted that the first and second light beam scanning modules 22, 23 are symmetrically disposed relative to a central line (L2) of the touch region 212 that is perpendicular to the reference line (L1). A distance (D) is formed between the first and second centers (C1, C2) of the first and second mirrors 222, 232 (see FIG. 4). In addition, the first mirror 222 and the first rotating actuator 223, and the second mirror 232 and the second rotating actuator 233 can be implemented into scanning micro-mirrors based on Micro-electro-mechanical system (MEMS), e.g., MEMS scanning micro-mirrors from Lemoptix.

In this embodiment, as shown in FIG. 3, the first and light sensor modules 24, 25 are mounted to the upper sub-region of the peripheral region 213, and are disposed respectively adjacent to the upper left corner and the upper right corner of the touch region 212. It is noted that the first and second light sensor modules 24, 25 are symmetrically disposed relative to the central line (L2). Thus, the first and second light sensor modules 24, 25 serve respectively as left and right light sensor modules. The first and second light sensor modules 24, have the same configuration as disclosed in U.S. patent application Ser. No. 13/506,138.

Figure 4:
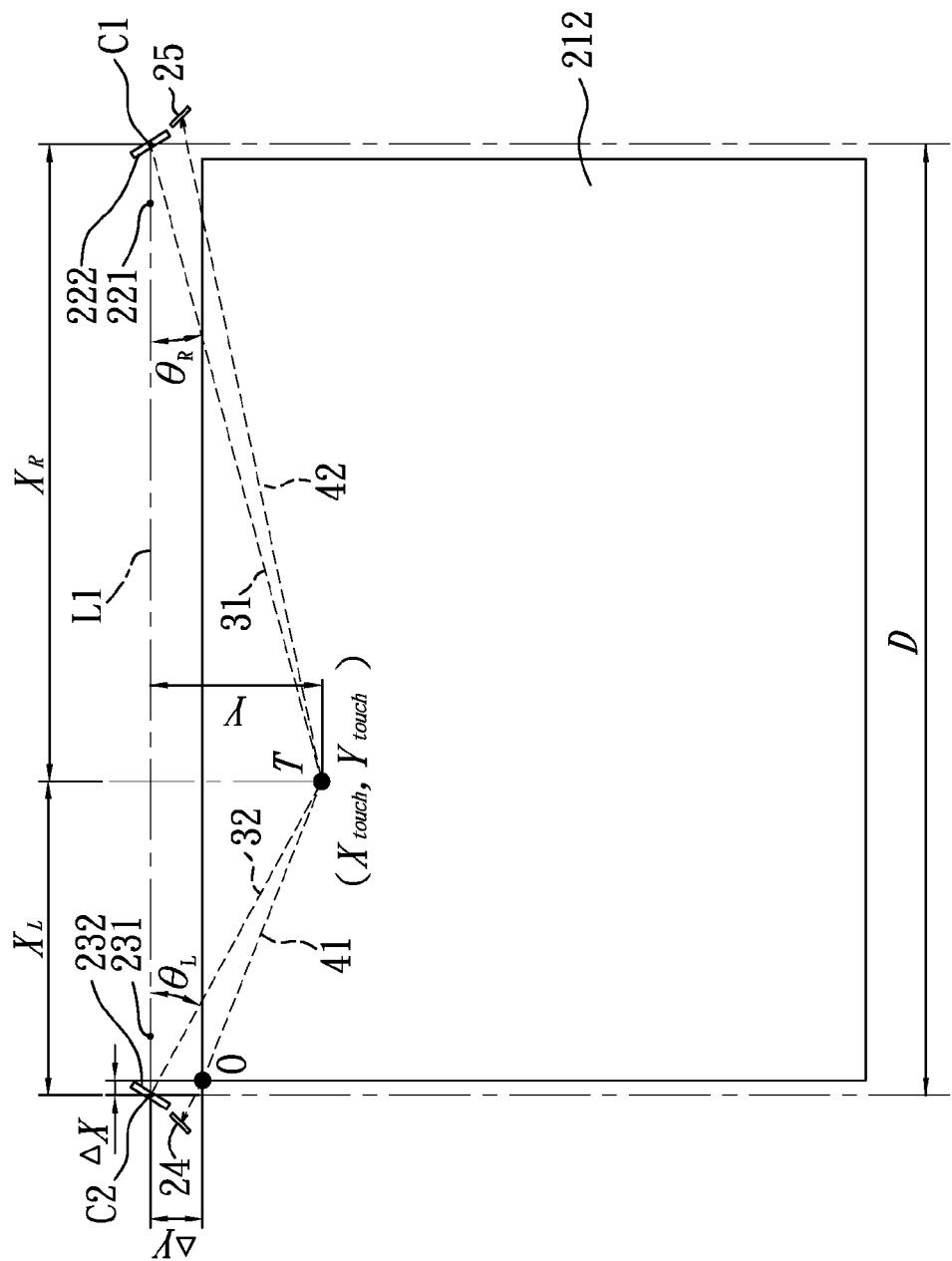
FIG. 4 is a schematic side view illustrating an example in which there is one touch within a touch region of the panel body.

The first light sensor module 24 is operable to sense at least one reflected first scanning light beam (e.g., a light beam 41 of FIG. 4), which is generated due to reflection of the first scanning light beam by at least one touch (e.g., a touch (T) of FIG. 4) within the touch region 212, so as to output a first sensing signal.

The second light sensor module 25 is operable to senses at least one reflected second scanning light beam (e.g., a light beam 42 of FIG. 4), which is generated due to reflection of the second scanning light beam by said at least one touch within the touch region 212, so as to output a second sensing signal.

In this embodiment, as shown in FIG. 3, the light absorption member 26 is made of a light absorbing and non-reflective material, and is disposed in the left, right and lower sub-regions of the peripheral region 213 to surround left, right and lower sides of the touch region 212.

The memory 27 stores a look-up table 271. The look-up table 271 includes the series of time indexes $(t_1 \sim t_n)$, and a plurality of pieces of angle information. The time indexes $(t_1 \sim t_n)$ correspond respectively to a series of time points within each scanning cycle $(T_{mirror})$ of the first and second light beam scanning modules 22, 23. During each scanning cycle $(T_{mirror})$ each of the first and second mirrors 222, 232 is actuated by the respective one of the first and second rotating actuators 223, 233 to rotate back and forth once. Each of the time indexes $(t_1 \sim t_n)$ is associated with the first and second incident angles $(\theta_{R\_i}, \theta_{L\_j})$ of the first and second scanning light beams 31, 32 at a corresponding one of the time points within each scanning cycle $(T_{mirror})$ of the first and second light beam scanning modules 22, 23. In this embodiment, $t_n = T_{mirror}$, and $$t_i - t_{i-1} = \Delta t = \frac{T_{mirror}}{n},$$

where i=1, 2, ..., n. Each piece of angle information corresponds to a respective one of the time indexes $(t_1 \sim t_n)$ and is associated with a respective one of the first and second incident angles $(\theta_{R\_i}, \theta_{L\_j})$ of the first and second scanning light beams 31, 32 at the corresponding one of the time points that corresponds to the respective one of the time indexes $(t_1 \sim t_n)$. In this embodiment, the look-up table 271 includes first and second sub-tables, as shown in Tables 1 and 2 below, that are associated respectively with the first and second incident angles $(\theta_{R\_i}, \theta_{R\_i})$ of the first and second scanning light beams 31, 32.

TABLE 1

| Time index | Angle information |
|---|---|
| $t_1$ | $\tan \theta_{R\_1}$ |
| $t_2$ | $\tan \theta_{R\_2}$ |
| . | . |
| . | . |
| . | . |
| $t_i$ | $\tan \theta_{R\_i}$ |
| . | . |
| . | . |
| . | . |
| $t_n$ | $\tan \theta_{R\_n}$ |

TABLE 2

| Time index | Angle information |
|---|---|
| $t_1$ | $\tan \theta_{L\_1}$ |
| $t_2$ | $\tan \theta_{L\_2}$ |
| . | . |
| . | . |
| . | . |
| $t_i$ | $\tan \theta_{L\_i}$ |
| . | . |
| . | . |
| . | . |
| $t_n$ | $\tan \theta_{L\_n}$ |

The first sub-table includes the time indexes $(t_1 \sim t_n)$, and a plurality of tangent values $(\tan \theta_{R\_1} \sim \tan \theta_{R\_n})$ of the first incident angle $(\theta_{R\_i})$ of the first scanning light beam 31 that are respectively associated with the time indexes $(t_1 \sim t_n)$. The second sub-table includes the time indexes $(t_1 \sim t_n)$, and a plurality of tangent values $(\tan \theta_{L\_1} \sim \tan \theta_{L\_n})$ of the second incident angle $(\theta_{L\_i})$ of the second scanning light beam 32 that are respectively associated with the time indexes $(t_1 \sim t_n)$. The tangent values $(\tan \theta_{R\_1} \sim \tan \theta_{R\_n})$ of the first incident angle $(\theta_{R\_i})$ of the first scanning light beam 31 and the tangent values $(\tan \theta_{L\_1} \sim \tan \theta_{L\_n})$ of the second incident angle $(\theta_{L\_i})$ of the second scanning light beam 32 are respectively the pieces of angle information.

Referring back to FIG. 2, the processing unit 28 is connected electrically to the first and second light beam scanning modules 22, 23, the first and second light sensor modules 24, 25 and the memory 27. The processing unit 28 receives the first and second time index signals $(t_{R\_i}, t_{L\_i})$ respectively from the first and second light beam scanning modules 22, 23, and the first and second sensing signals respectively from the first and second light sensor modules 24, 25. The processing unit 28 is operable to locate said at least one touch based on a first candidate one of the time indexes $(t_1 \sim t_n)$ represented by the first time index signal $(t_{R\_i})$ that is receive by the processing unit 28 upon receipt of the first sensing signal by the processing unit 28, a second candidate one of the time indexes $(t_1 \sim t_n)$ represented by the second time index signal $(t_{L\_i})$ that is received by the processing unit 28 upon receipt of the second sensing signal by the processing unit 28, and the look-up table 271 stored in the memory 27.

For example, referring to FIG. 4, when there is a single touch (T) within the touch region 212, the first scanning light beam 31, the first incident angle $(\theta_{R\_i})$ of which becomes $\theta_R$, is reflected by the touch (T) to generate the reflected first scanning light beam 41. At the same time, the first time index signal $(t_{R\_i})$ outputted by the first rotating actuator 223 (shown in FIG. 2) is represented as a first candidate one of the time indexes $(t_1 \sim t_n)$, which corresponds to $\theta_R$ as indicated in Table 1. Similarly, the second scanning light beam 32, the second incident angle $(\theta_{L\_i})$ of which becomes $\theta_L$, is reflected by the touch (T) to generate the reflected second scanning light beam 42. At the same time, the second time index signal $(t_{L\_i})$ outputted by the second rotating actuator 233 (as shown in FIG. 2) represents a second candidate one of the time indexes $(t_1 \sim t_n)$, which corresponds to $\theta_L$ as indicated in Table 2. Then, the angle information corresponding to $\theta_R$, i.e., $\tan \theta_R$, is obtained from the first sub-table, i.e., Table 1, to be one of the tangent values $(\tan \theta_{R\_1} \sim \tan \theta_{R\_n})$ that corresponds to the first candidate one of the time indexes $(t_1 \sim t_n)$. Similarly, the angle information corresponding to $\theta_L$, i.e., $\tan \theta_L$, is obtained from the second sub-table, i.e., Table 2, to be one of the tangent values $(\tan \theta_{L\_1} \sim \tan \theta_{L\_n})$ that corresponds to the second candidate one of the time indexes $(t_1 \sim t_n)$. Thereafter, the processing unit 28 determines the position of the touch (T)

based on the tangent values (tan θ_R, tan θ_L) thus obtained and the distance (D). In detail, the distance (D) is equal to a sum of an X-direction component (X_R) of a distance between the touch (T) and the first center (C1) of the first mirror 222, and an X-direction component (X_L) of a distance between the touch (T) and the second center (C2) of the second mirror 232. The processing unit 28 determines, based on the tangent values (tan θ_R, tan θ_L), the X-direction components (X_R, X_L) that can be respectively represented by the following Expressions (1) and (2).

$$X_R = \frac{\tan\theta_L \times D}{\tan\theta_R + \tan\theta_L} \quad (1)$$

$$X_L = D - X_R \quad (2)$$

In addition, the processing unit 28 determines, based on the tangent values (tan θ_R, tan θ_L) and the X-direction components (X_R, X_L), a Y-direction component (Y) of the distance between the touch (T) and the first center (C1) of the first mirror 222 or the distance between the touch (T) and the second center (C2) of the second mirror 222. The Y-direction component (Y) can be represented by one of the following Expressions (3) and (4).

$$Y = \tan\theta_R \times X_R \quad (5)$$

$$Y = \tan\theta_L \times X_L \quad (6)$$

Thus, the processing unit 28 determines a relative two-dimensional coordinate of the touch (T) based on the X-direction component (X_L) and the Y-direction component (Y). It is noted that the relative two-dimensional coordinate is a two-dimensional coordinate relative to an origin located at the second center (C2) of the second mirror 232. As such, the relative two-dimensional coordinate can be converted into an absolute two-dimensional coordinate (X_touch, Y_touch) for the touch region 212 relative to an origin (O) located at the upper left corner of the touch region 212. The absolute two-dimensional coordinate (X_touch, Y_touch) can be represented as (X_L−ΔX, Y−ΔY), where ΔX is a distance between the origin (O) and the second center (C2) in the X direction, and ΔY is a distance between the origin (O) and the second center (C2) in the Y direction.

Figure 5:
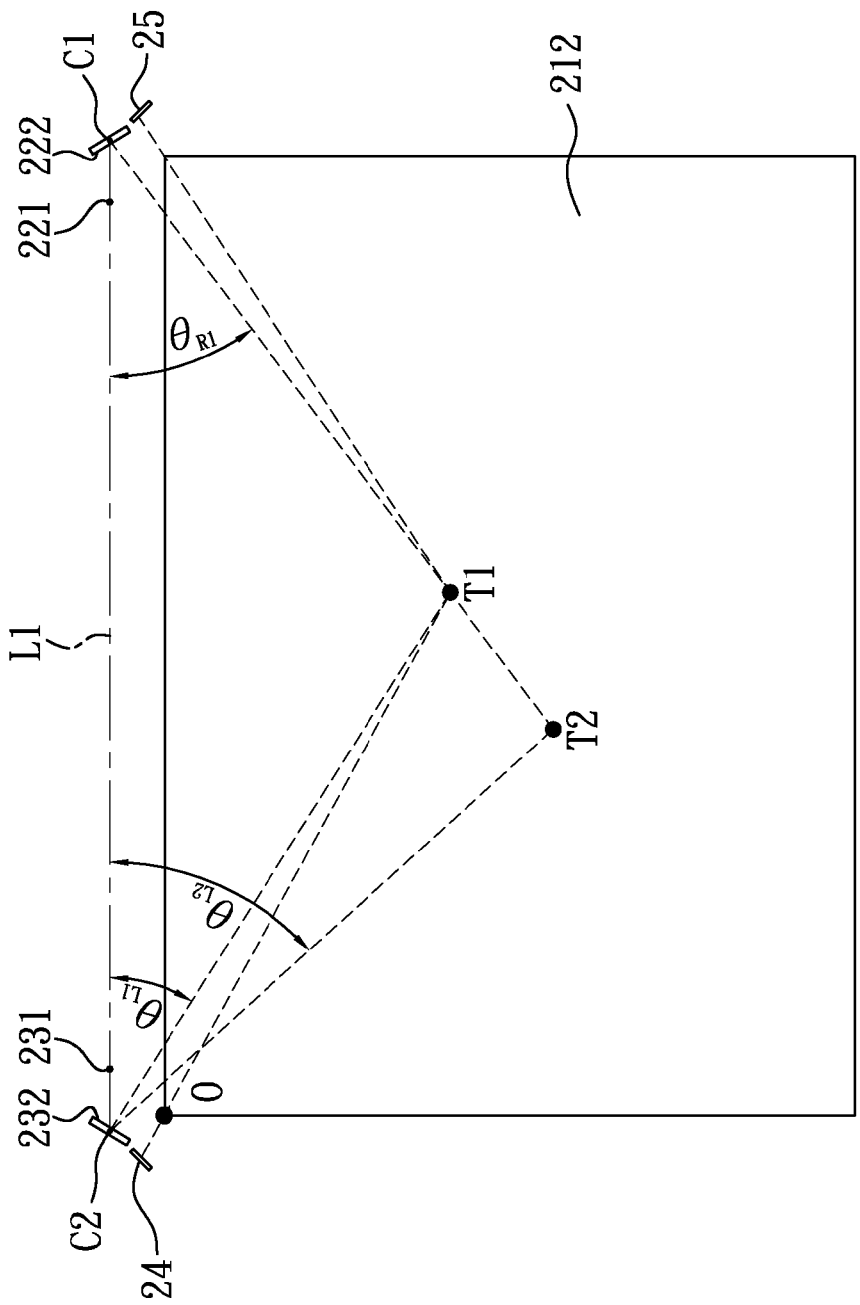
FIGS. 5 to 7 are schematic side views illustrating three examples in which there are two touches within the touch region of the panel body.
Figure 6:
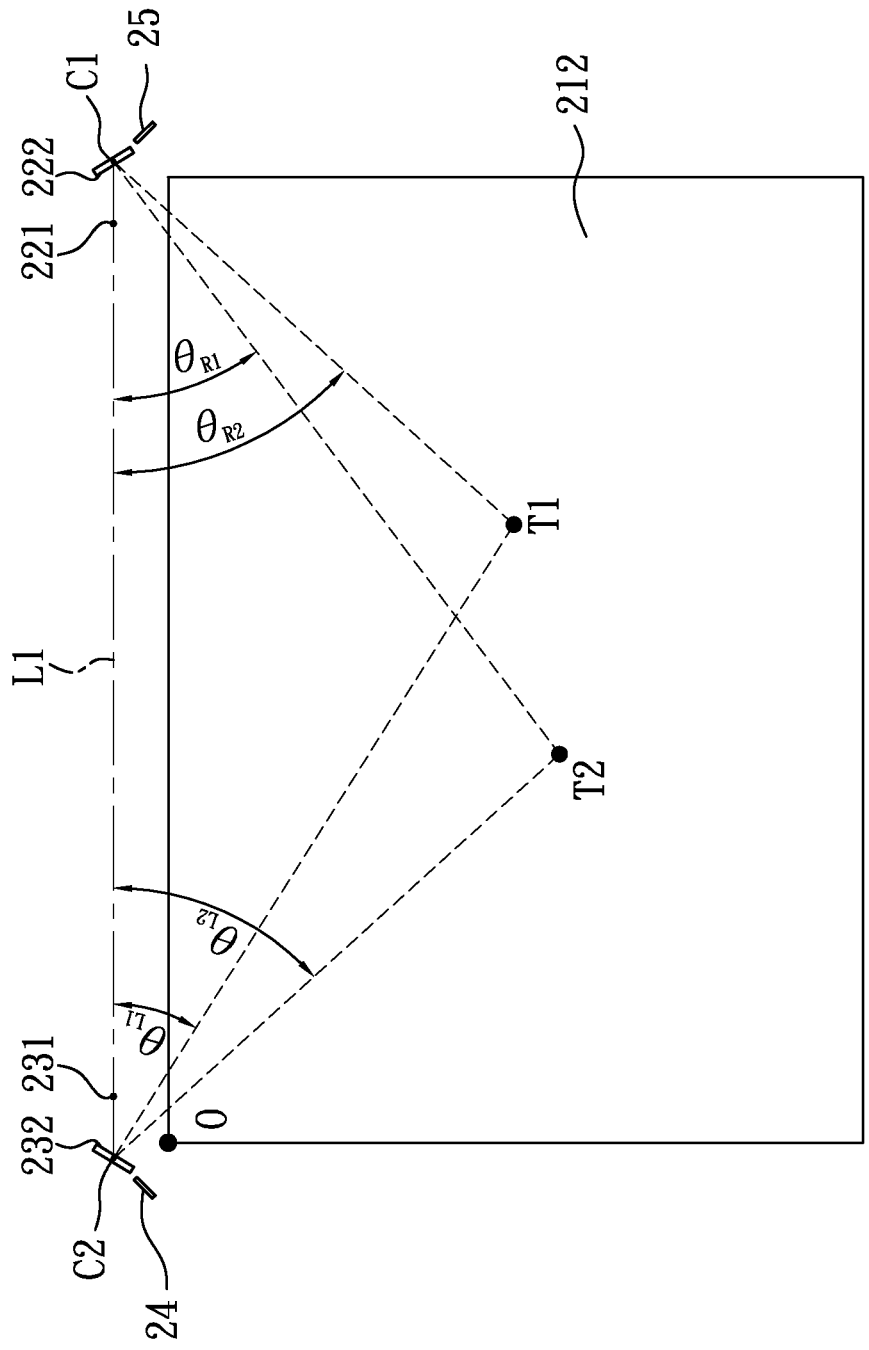
Figure 7:
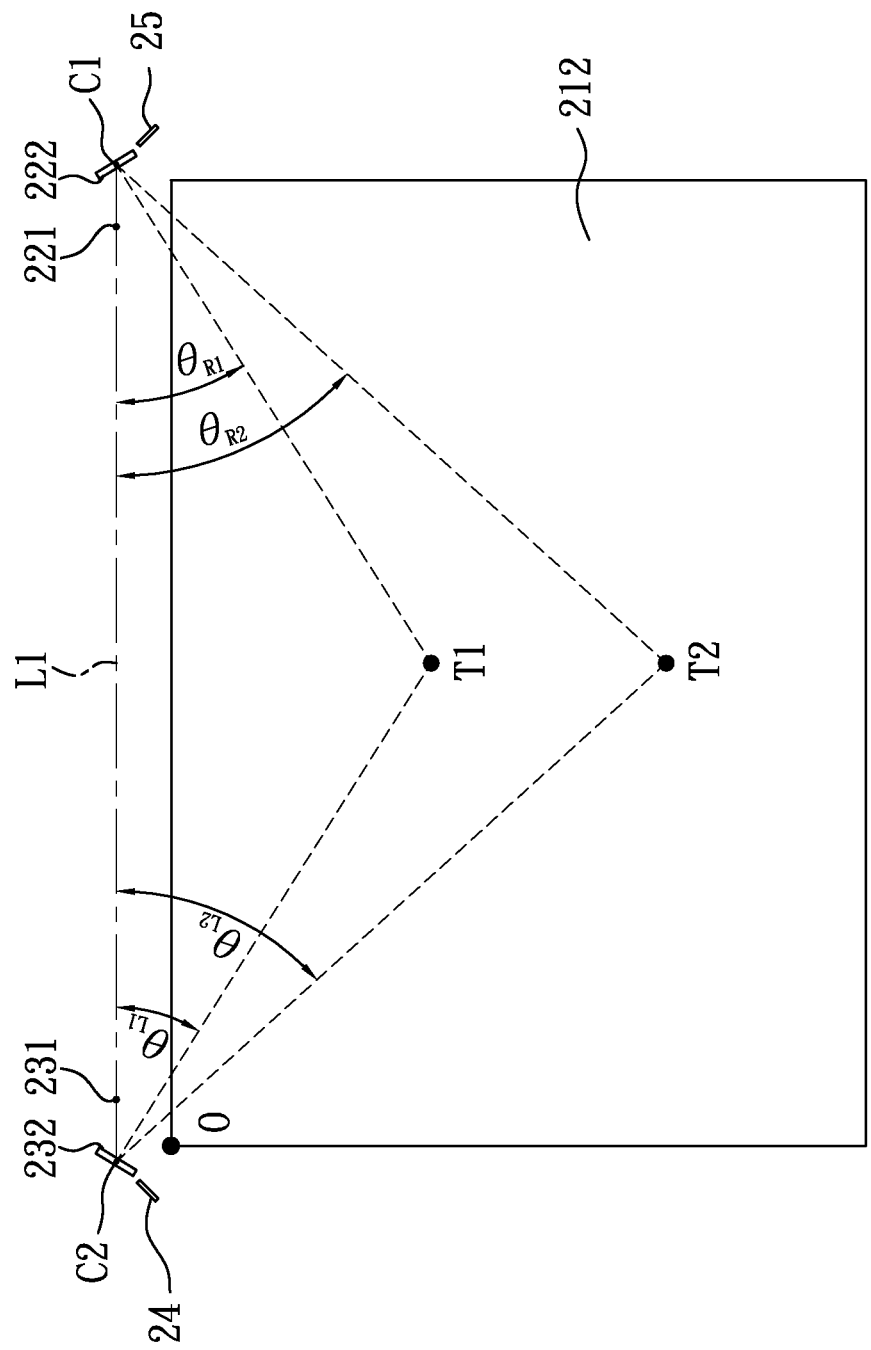

FIGS. 5 to 7 illustrate three examples in which there are two touches (T1, T2) within the touch region 212. In the example of FIG. 5, the touches (T1, T2) and the first center (C1) of the first mirror 222 are collinear. In this case, the first sensing signal is generated by the first light sensor module 24 in response to sensing of a reflected first scanning light beam (not labeled) that is generated due to reflection of the first scanning light beam by the touch (T1). Two second sensing signals are generated by the second light sensor module 25 respectively in response to sensing of two reflected second scanning light beams (not labeled) that are generated respectively due to reflections of the second scanning light beam by the touches (T1, T2). Thus, the processing unit 28 can locate the touches (T1, T2) based on the angle information of tan θ_R1, which is obtained from Table 1 based on the first time index signal that is received by the processing unit 28 at the time of receipt of the first sensing signal, and the angle information of tan θ_L1 and tan θ_L2, which are obtained from Table 2 based on the second time index signals that are received by the processing unit 28 respectively at the times of receipt of the second sensing signals.

In the examples of FIGS. 6 and 7, the touches (T1, T2) are not collinear with either one of the first and second centers (C1, C2) of the first and second mirrors 222, 232. In this case, two first sensing signals are generated by the first light sensor module 24 respectively in response to sensing of two reflected first scanning light beams (not labeled) that are generated respectively due to reflections of the first scanning light beam by the touches (T1, T2). In addition, two second sensing signals are generated by the second light sensor module 25 respectively in response to sensing of two reflected second scanning light beams (not labeled) that are generated respectively due to reflections of the second scanning light beam by the touches (T1, T2). Thus, the processing unit 28 can locate the touches (T1, T2) based on the angle information of tan θ_R1 and tan θ_R2, which are obtained from Table 1 based on the first time index signals that are received by the processing unit 28 respectively at the times of receipt of the first sensing signals, and the angle information of tan θ_L1 and tan θ_L2, which are obtained from Table 2 based on the second time index signals that are received by the processing unit 28 respectively at the times of receipt of the second sensing signals. It should be noted that, in each of the examples of FIGS. 6 and 7, the processing unit 28 is able to distinguish the touches (T1, T2) from a plurality of ghost touches (not shown) in accordance with the first and second time index signals from the first and second light beam scanning modules 22, 23 and the first and second sensing signals from the first and second light sensor modules 24, 25, as described in U.S. patent application Ser. No. 13/506,138, which is incorporated herein by reference.

To sum up, due to the presence of the first and second light beam scanning modules 22, 23 and the look-up table 271, the optical touch device 2 of the present invention can easily locate one or two touches within the touch region 212 without relatively complicated triangulation computation.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An optical touch device comprising:
   a panel body having a surface, said surface being configured with a touch region, and a peripheral region that surrounds said touch region;
   a first light beam scanning module mounted to said peripheral region for continuously scanning said touch region with a first scanning light beam in a manner that, during each scanning cycle, a first incident angle of the first scanning light beam relative to a reference line varies within a predetermined angle range with time, said first light beam scanning module outputting a first time index signal that is associated with the first incident angle of the first scanning light beam, that varies with time during each scanning cycle, and that represents one of a series of time indexes, said first light beam scanning module including
   a first light source for continuously generating a first light beam,
   a first mirror positioned to reflect the first light beam to generate the first scanning light beam incident into said touch region, said first mirror having a first center that is passed through by the reference line, and
   a first rotating actuator coupled to said first mirror for continuously rotating back and forth said first mirror about said first center to thereby vary the first incident angle of the first scanning light beam within the predetermined angle range during each scanning cycle, said first rotating actuator being operable to generate and output the first time index signal during rotation of said first mirror;

a second light beam scanning module mounted to said peripheral region for continuously scanning said touch region with a second scanning light beam in a manner that, during each scanning cycle, which is the same as that of said first light beam scanning module, a second incident angle of the second scanning light beam relative to the reference line varies within the predetermined angle range with time, and for outputting a second time index signal that is associated with the second incident angle of the second scanning light beam, that varies with time during each scanning cycle, and that represents one of the series of time indexes, said second light beam scanning module including a second light source for continuously generating a second light beam, a second mirror positioned to reflect the second light beam to generate the second scanning light beam incident into said touch region, said second mirror having a second center that is passed through by the reference line, and a second rotating actuator coupled to said second mirror for continuously rotating back and forth said second mirror about said second center to thereby vary the second incident angle of the second scanning light beam within the predetermined angle range during each scanning cycle, said second rotating actuator being operable to generate and output the second time index signal during rotation of said second mirror;

a first light sensor module mounted to said peripheral region for sensing at least one reflected first scanning light beam generated due to reflection of the first scanning light beam by at least one touch within said touch region so as to output a first sensing signal;

a second light sensor module mounted to said peripheral region for sensing at least one reflected second scanning light beam generated due to reflection of the second scanning light beam by said at least one touch within said touch region so as to output a second sensing signal;

a memory for storing a look-up table, said look-up table including a series of time indexes that correspond respectively to a series of time points within each scanning cycle of said first and second light beam scanning modules, during which each of said first and second mirrors is actuated by the respective one of said first and second rotating actuators to rotate back and forth once, each of the time indexes being associated with the first and second incident angles of the first and second scanning light beams at a corresponding one of the time points within each scanning cycle of said first and second light beam scanning module, and a plurality of pieces of angle information, each corresponding to a respective one of the time indexes and being associated with a respective one of the first and second incident angles of the first and second scanning light beams at the corresponding one of the time points that corresponds to the respective one of the time indexes; and a processing unit connected electrically to said first and second light beam scanning modules, said first and second light sensor modules and said memory, said processing unit receiving the first and second time index signals respectively from said first and second light beam scanning modules, and the first and second sensing signals respectively from said first and second light sensor modules, said processing unit being operable to locate said at least one touch based on one of the time indexes, which is represented by the first time index signal that is received by said processing module upon receipt of the first sensing signal by said processing unit, one of the time indexes, which is represented by the second time index signal that is received by said processing unit upon receipt of the second sensing signal by said processing unit, and the look-up table stored in said memory.

2. The optical touch device as claimed in claim 1, wherein:
said first and second light beam scanning modules are symmetrically disposed relative to a central line of said touch region that is perpendicular to the reference line; and said first and second light sensor modules are symmetrically disposed relative to the central line of said touch region.

3. The optical touch device as claimed in claim 2, wherein said touch region is rectangular, and said peripheral region consists of four sub-regions, one of which is parallel to the reference line and has said first and second light beam scanning modules and said first and second light sensor modules disposed thereon, said optical touch device further comprising a light absorption member disposed in the other ones of said sub-regions of said peripheral region.

4. The optical touch device as claimed in claim 3, wherein said first light beam scanning module is disposed adjacent to an upper right corner of said touch region, and said second light beam scanning module is disposed adjacent to an upper left corner of said touch region.

5. The optical touch device as claimed in claim 4, wherein said first light sensor module is disposed adjacent to said upper left corner of said touch region, and said second light sensor module is disposed adjacent to said upper right corner of said touch region.

6. The optical touch device as claimed in claim 1, wherein the look-up table stored in said memory includes first and second sub-tables associated respectively with the first and second incident angles of the first and second scanning light beams, the first sub-table including the time indexes, and a plurality of tangent values of the first incident angle of the first scanning light beam that are respectively associated with the time indexes, said second sub-table including the time indexes, and a plurality of tangent values of the second incident angle of the second scanning light beam that are respectively associated with the time indexes, the tangent values of the first incident angle of the first scanning light beam and the tangent values of the second incident angle of the second scanning light beam respectively being the pieces of angle information.

* * * * *